US006459499B1

(12) United States Patent
Tomat

(10) Patent No.: US 6,459,499 B1
(45) Date of Patent: Oct. 1, 2002

(54) PUSH TECHNOLOGY FOR NETWORK SCANNER

(75) Inventor: Andrew Hunter Tomat, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,422

(22) Filed: Dec. 22, 1998

(51) Int. Cl.⁷ .............................................. G06K 15/00
(52) U.S. Cl. ..................................... 358/1.15; 358/1.9
(58) Field of Search ................................ 358/444, 468, 358/1.15, 1.16, 1.9

(56) References Cited

U.S. PATENT DOCUMENTS

| | | | | |
|---|---|---|---|---|
| 5,845,078 A | * | 12/1998 | Tezuka et al. | 395/200.52 |
| 6,147,770 A | * | 11/2000 | Unishi et al. | 358/1.2 |
| 6,256,662 B1 | * | 7/2001 | Lo et al. | 709/203 |
| 2001/0013954 A1 | * | 8/2001 | Nagai et al. | 358/444 |

FOREIGN PATENT DOCUMENTS

JP      410276288 A  *  11/1998  ............ H04N/1/00

OTHER PUBLICATIONS

"PaperPort 5.0 Software for Windows® Getting Started Guide", Visioneer, Inc., 1997.
"PaperPort Deluxe Software User's Guide for Windows", Visioneer, Inc., 1997.
"Canon MultiPASS™ C550—MultiPASS™ Desktop Manager for Windows Version 3.0, Software User's Guide", Canon, Inc., 1997–98.
"HP Digital Sender Data Sheet", <http://www.hp.com/peripherals/printers/9100c.html> (visited Jan. 15, 1999).
"Xerox CentreWare: Products Scanning",<http://www.centreware.com/products/scanning.html> (visited Jan. 15, 1999).
"Xeros CentreWare: Products", <http://www.centreware.com/products/scanning_spec.html> (visited Jan. 15, 1999).
"Axis Communications–Products–Axis 700 Network Scan Server", <http://www.axis.com/glocal/products/scan_servers/index.html> (visited Jan. 15, 1999).
"Axis Communications–Products–Axis 700 Network Scan Server", <http://www.axis.com/products/axis_700/> (visited Jan. 15, 1999).
"Axis Communications–Products–Network Scan Servers Data", <http://www.axis.com/products/axis_700/axis_700_data.html> (visited Jan. 15, 1999).
"Axis 700 User's Guide", Axis Communications AB, Jun. 1998.
"VistaScan (for PC) User's Guide", UMAX Data Systems, Inc., 1994–1996.

* cited by examiner

Primary Examiner—Jerome Grant, II
(74) Attorney, Agent, or Firm—Fitzpatrick, Cella, Harper & Scinto

(57) ABSTRACT

A system for scanning a document and sending a corresponding image file to a remote recipient using a software autosend utility that accesses predefined profiles of potential recipients. The predefined profiles including transport protocols and image scanning characteristics for such recipients. According to the invention, the autosend utility is launched, and the autosend utility receives user input identifying the remote recipient. Based on the profile corresponding to the identity of the remote recipient, image scanning characteristics and a transport protocol for the resulting image data are is both determined. The document is scanned in accordance with the determined image scanning characteristics, and a temporary image file containing image data for the scanned document is stored. The temporary image file is sent to the remote recipient using the determined transport protocol.

32 Claims, 11 Drawing Sheets

50

USER PROFILES:

110 — PROFILE 1:

115 — NAME

116 — TRANSPORT INFORMATION:
        TRANSPORT PROTOCOL — 119
        TRANSPORT ADDRESS — 120
        •
        •
        •

117 — IMAGE SCANNING CHARACTERISTICS:
        IMAGE TYPE
            COLOR MODE — 122
        IMAGE RESOLUTION — 124
   125 — PAPER SIZE
    126 — IMAGE FILE FORMAT
        IMAGE FILE PAGE NUMBERING — 127
        TEMPORARY IMAGE FILE NAME — 128
        •
        •
        •

•
        •
        •

111 — PROFILE 2...

112 — PROFILE 3...

PUSH TECHNOLOGY FOR NETWORK SCANNER

BACKGROUND OF THE INVENTION

1. Field of the Invention

The present invention concerns scanning a document and sending a corresponding image file to a remote recipient. In particular, the invention concerns scanning and sending the document using an autosend utility that accesses predefined profiles of potential recipients.

2. Description of the Related Art

High-quality document scanning can now be performed using relatively inexpensive scanning devices. Such scanning devices are attached directly to a computing device, for example a PC-compatible computer, and image files are created on the computing device based on scanned documents.

Despite the prevalence of such scanning devices, there are still situations in which a user's computing device does not have a connected scanning device, although a scanning device is connected to a nearby computing device. To create an image file on his own computing device, such a user would go to the nearby computing device and would use the scanning device to create an image file on the nearby computing device. Thereafter, the user would somehow send the image file to his own (and now remote) computing device.

The creation of the image file using another user's computing device can be complicated, particularly for inexperienced users. Each individual user ordinarily wants his image files scanned using particular scanning characteristics, such as resolution in dots per inch (dpi), color depth, etc. However, since scanning is performed at a different computing device, the defaults for that computing device ordinarily are used. As a result, mismatches often occur between an image file and a method that a recipient uses to view the file, resulting in disparity. For example, if a recipient uses a 300 dpi resolution printer to print an image file scanned for screen display at 72 dpi, then significant distortion will occur as the printer attempts to adjust for the resolution mismatch.

The user can manually override or reset the defaults for the scanning characteristics before scanning. However, manually overriding or resetting the default scanning characteristics can be cumbersome. In addition, each user must keep track of his desired scanning characteristics and set the scanning device correspondingly prior to a scan operation.

Moreover, once the document is scanned, sending the resulting image file to the remote computing device is ordinarily difficult and time-consuming, particularly for inexperienced users. Conventional file transport protocols do exist to send image files to remote recipients. These transport protocols include E-mail, file transport protocol (ftp), Distributed Component Object Model (DCOM), and using shared network disks. However, a user typically must have significant knowledge of the transport protocols in order to use them. As a result, not all users can easily use these protocols to send image files. In addition, manually sending the files using these protocols is often cumbersome.

Similar problems arise when the user scans a document and sends the resulting image file to a remote recipient other than himself. In this situation, the user still must set the scanning characteristics in order to avoid disparity, and the user must somehow determine an appropriate data transport protocol to send the file to the remote recipient. Thus, the user must set the scanning characteristic according to the remote recipient and must send the resulting file to the recipient using an appropriate file transport protocol.

SUMMARY OF THE INVENTION

Accordingly, what is needed is a system that automatically allows a user to scan a document using scanning characteristics corresponding to a remote recipient and to send the resulting image file to the remote recipient using an appropriate file transport protocol using the minimum number of keystrokes.

The invention addresses the foregoing need by providing a system for scanning a document and sending a corresponding image file to a remote recipient using a software autosend utility that accesses predefined profiles of potential recipients. The predefined profiles include image scanning characteristics and transport protocols for such recipients. Once a particular recipient is identified, the document is scanned according to scanning characteristics for that recipient, and the resulting image file is sent to the recipient using the transport protocol for that recipient. For example, a profile for a first recipient might define scanning at 300 dpi in 24-bit color mode, followed by a transport protocol using E-mail; whereas a profile for a second recipient might define scanning at facsimile (100×200) resolution followed by a transport protocol using ftp.

By virtue of the foregoing operation, a user can scan a document and send the resulting image file by simply launching the autosend utility and identifying a remote recipient. The autosend utility automatically determines how to scan and send the image file based on the profile, thereby simplifying the operations that the user must perform.

Thus, in one aspect the present invention is a method for scanning a document and sending a corresponding image file to a remote recipient using a software autosend utility that accesses pre-defined profiles of potential recipients. The pre-defined profiles including transport protocols and image scanning characteristics for such recipients. The scanning characteristics preferably include at least scanning resolution and color depth (e.g., black/white, 8-bit color, 16-bit color, true color, etc.). The transport protocols preferably include E-mail, ftp, Microsoft®'s Distributed Component Object Model (DCOM), which allows data to be transported and opened in applications on remote computing devices, and Windows® file move/copy.

According to the invention, the autosend utility is launched, and the autosend utility receives user input identifying the remote recipient. Based on the profile corresponding to the identity of the remote recipient, the image scanning characteristics and transport protocol for resulting image data are determined. The document is scanned in accordance with the determined image scanning characteristics, and a temporary image file containing image data for the scanned document is stored. The temporary image file is then sent to the remote recipient using the determined transport protocol. Then, the temporary image file preferably is deleted so as to avoid wasting image file storage space.

In the preferred embodiment, a scanning device used to scan the document is attached to a computing device that implements the invention, such as an IBM-PC compatible computer running Windows® 98. Furthermore, the autosend utility preferably is launched in response to activation of an interface to the scanning device, such as a push button or a screen touch interface (STI).

If the invention is implemented on a PC running Windows® 98, then pressing the push button preferably activates the autosend utility through the "PUSH" feature of the Windows® 98 Still Imaging Interface event monitor. This PUSH feature launches a program, in this case the autosend utility, when a push button or other interface on a peripheral device is activated.

By virtue of the PUSH operation, a user simply places a document on a scanning device connected to the PC and presses the scan button on the scanning device. The autosend utility is automatically launched, and the user inputs the identity of a remote recipient. The autosend utility then initiates scanning of the document using the scanning characteristics for that recipient, and sends the resulting image file to the recipient using the transport protocol for that recipient.

The predefined profiles can be either stored locally on a computing device that implements the invention, or stored centrally such as on a network drive. If the profiles are stored centrally, the profiles preferably are updatable remotely by each of the potential recipients. Thus, the recipients can change the scanning characteristics and transport protocols to suit changes in their hardware and software.

By virtue of the foregoing, the present invention automatically determines how to scan and send a resulting image file based on profiles of potential recipients. As a result, the invention facilitates use of a scanning device connected to a computing device other than the user's own computing device.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 5 is a representational view of user profiles according to the invention that are accessed by an autosend utility upon execution.

DETAILED DESCRIPTION OF THE PREFERRED EMBODIMENTS

Figure 1:
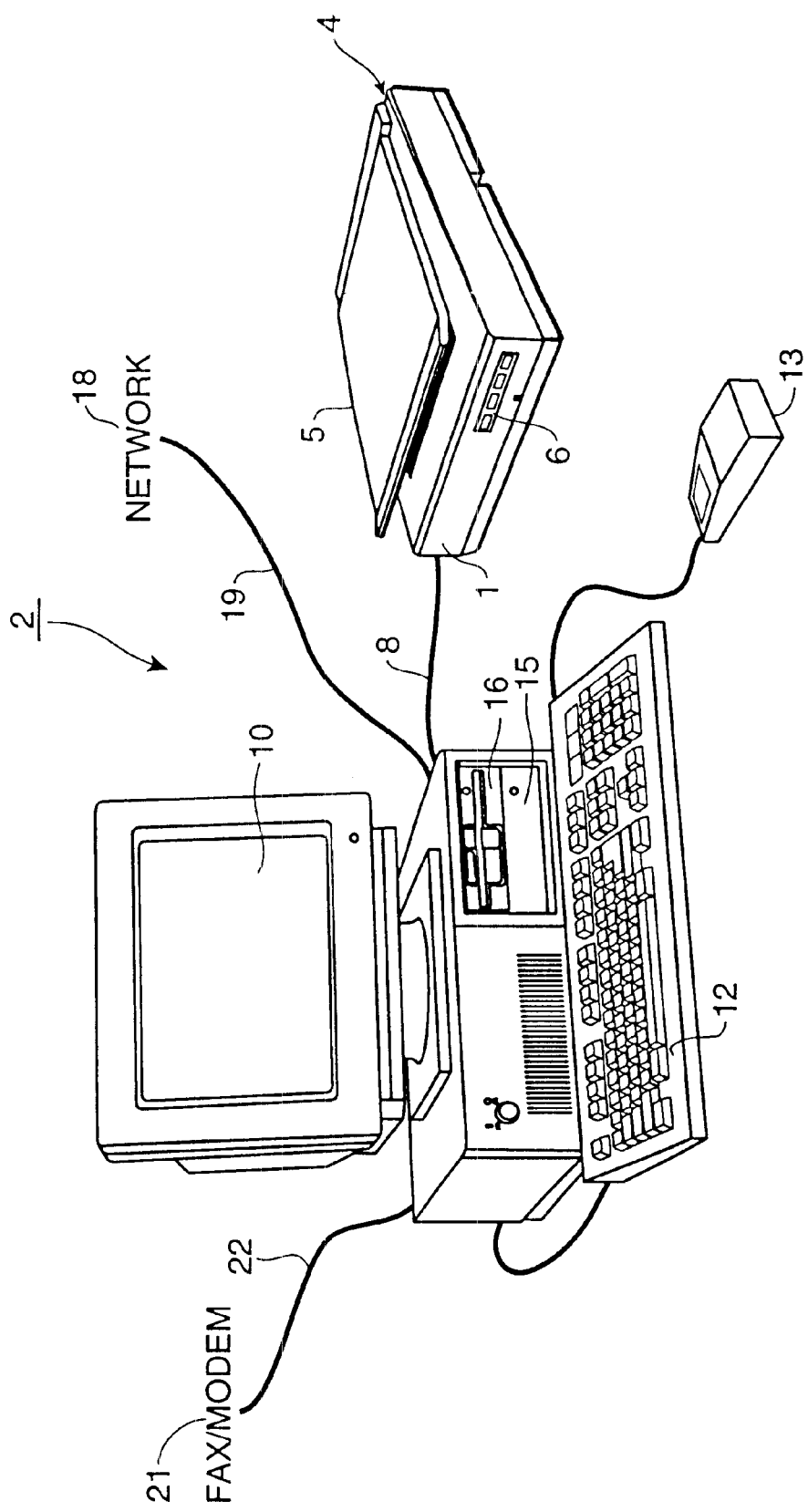
FIG. 1 is a representational view of a scanner for creating image files attached to a computer system for storing, manipulating and sending those files to other computer systems and devices.

FIG. 1 is a representational view of scanner 1 for creating image files attached to computer system 2 for storing, manipulating and sending those files to other computer systems and devices. As shown in FIG. 1, scanner 1 includes platen 4 on which a document to be scanned is placed, along with cover 5 for covering the document. Scanner 1 also includes interface 6 for use by a user to operate scanner 1. Interface 6 can comprise a push-button interface or a screen-touch interface (STI).

In the preferred embodiment, interface 6 allows a user to perform "one button scanning". In one button scanning, a user places a document on platen 4 and then presses a scan button or the like on interface 6 so as to signal computer 2 to initiate scan processing.

In an alternative embodiment, interface 6 to scanner 1 is not located on scanner 1. Instead, interface 6 is a graphical user interface output by and manipulated with computer system 2. In this alternative embodiment, scanner 1 is activated through the graphical user interface.

Also shown in FIG. 1 is computer system 2 connected to scanner 1 through scanner interface 8. Computer system 2 preferably includes display 10 for outputting images, keyboard 12 for entry of user commands and data, and mouse 13 for manipulation of images such as graphical user interfaces and images output from image files. Also preferably included is fixed disk 15 for storage of an operating system, drivers including a scanner driver, application programs including an autosend utility according to the invention, file transport programs, and data including image files and user profiles according to the invention. Floppy disk interface 16 is included for providing an interface to removable storage media. Storage also can be provided by a CD-ROM (not shown).

Computer system 2 is capable of sending data such as image files to computer systems and/or other devices that are physically remote from computer system 2. In the embodiment illustrated in FIG. 1, computer system 2 sends this data through network 18 using network interface 19 or through fax/modem 21 using fax/modem interface 22, using one or more file transport protocols.

Figure 2:
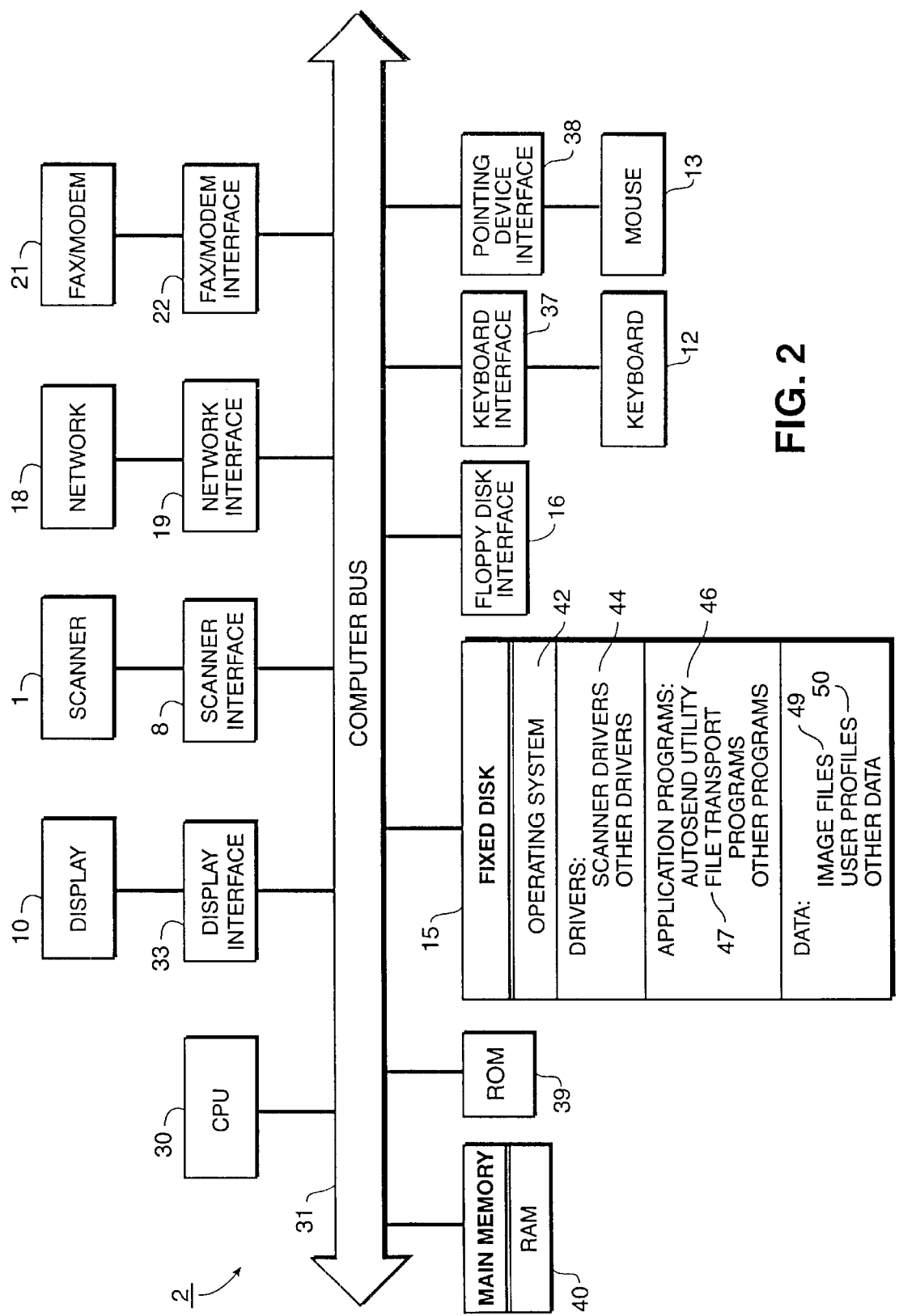
FIG. 2 is a detailed block diagram showing the internal architecture of the computer system shown in FIG. 1.

FIG. 2 is a detailed block diagram showing the internal architecture of computer system 2. As shown in FIG. 2, computer system 2 includes central processing unit (CPU) 30, such as an Intel® Pentium® microprocessor, interfaced to computer bus 31. Also interfaced to computer bus 31 are display interface 33 to display 10, scanner interface 8 to scanner 1, network interface 19 to network 18, fax/modem interface 22 to fax/modem 21, floppy disk interface 16, keyboard interface 37 to keyboard 12, pointing device interface 38 to a pointing device such as mouse 13, read-only memory (ROM) 39, main memory 40, and fixed disk 15.

ROM 39 is used for storing process steps, such as those used during boot-up of computer system 2, or basic input/output operating system (BIOS) sequences for operation of, for example, keyboard 12.

Main memory 40, such as random access memory (RAM), interfaces to computer bus 31 so as to provide CPU 30 with access to memory storage for computer executable process steps. In particular, CPU 30 loads those steps from fixed disk 15 or another source into main memory 40 and executes those process steps out of main memory 40. Main memory 40 also provides temporary storage for data such as image files and user profiles for access by CPU 30.

Fixed disk 15 provides storage for process steps for operating system 42 which is preferably a windowing operating system such as Windows® 98, as well as for drivers and application program. The drivers include scanner driver 44, and the application programs include autosend utility 46 according to the invention and file transport programs 47. Fixed disk 15 also includes data such as image files 49 and preferably user profiles 50.

The autosend utility according to the invention is described in detail below in connection with FIGS. 6 to 11. In general, the autosend utility is activated upon initiation of a scan operation so as to allow a user to select a recipient for a scanned document and so as to scan and to send an image file for the document to the recipient based on a user profile for the recipient.

User profiles 50 are explained in more detail below in connection with FIG. 5. Generally speaking, user profiles 50 include predefined profiles for potential recipients of image files scanned by scanner 1. Each profile has associated therewith image scanning characteristics and transport information including a transport protocol.

File transport programs 47 include programs for sending files such as image files 49 from computer system 2 to other computer systems and devices connected to computer system 2. The transport programs preferably include an E-mail client, an ftp client, and a Distributed Component Object Model (DCOM) client. File transport also can be provided by built-in functionality of operating system 42, for example through a file move/copy command in the case of Windows® 98.

Computer system 2 can be connected to other computer systems and device through network 18 and/or fax/modem 21, for example. These connections are explained in more detail below with reference to FIG. 3.

Figure 3:
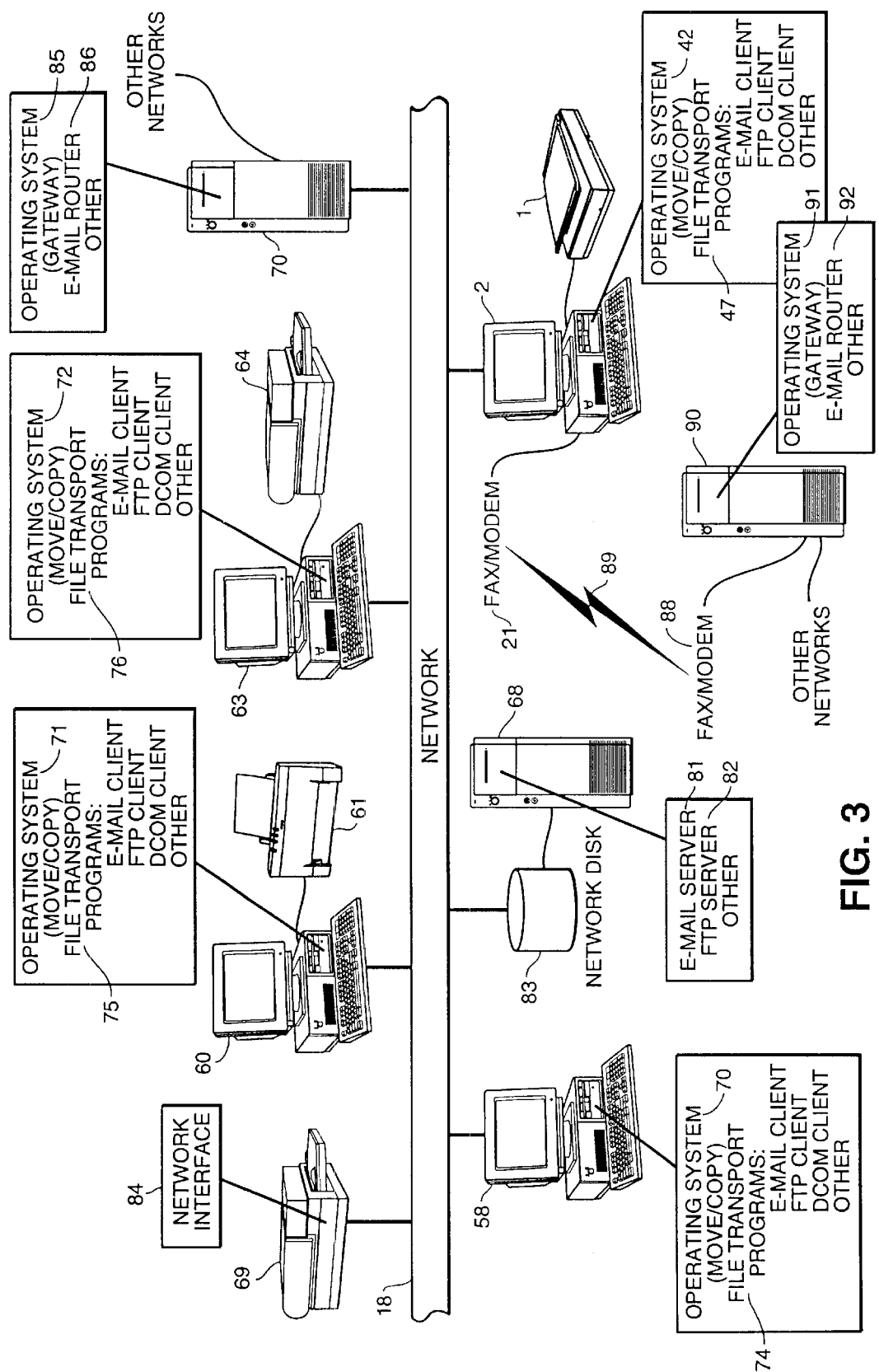
FIG. 3 is a representational view illustrating examples of connections between the computer system shown in FIG. 1 and other computer systems and devices.

FIG. 3 is a representational view illustrating examples of connections between computer system 2 and other computer systems and devices. As shown in FIG. 3, computer system 2 can be connected to other computer systems and devices through network 18. Network 18 preferably is a local area network such as an Ethernet network, although any other type of network can be utilized.

Network 18 provides connections between computer system 2, computer system 58, computer system 60 with ink jet printer 61 attached thereto, computer system 63 with laser printer 64 attached thereto, server 68, network printer 69, and gateway 70. Gateway 70 in turn provides connections to other networks such as the World Wide Web, and thus to the computer systems and devices connected to those other networks.

The computer systems and servers connected to network 18 execute various operating system functions and file transport programs so as to send file therebetween. Thus, as mentioned above, computer system 2 preferably executes operating system 42 which includes a file move/copy function and executes file transport programs 47 which include an E-mail client, an ftp client, and a DCOM client. Computer systems 58, 60 and 63 preferably execute similar operating systems and programs, namely operating systems 70 to 72 and file transport programs 74 to 76.

Operating systems 42 and 70 to 72 are not necessarily the same operating system, although they should be compatible so as to allow communication between the computer systems. Likewise, computer systems 2, 58, 60 and 63 do not necessarily execute the same file transport programs.

Server 68 preferably executes E-mail server 81 and ftp server 82 so as to provide E-mail and ftp services to computer systems running on network 18. Furthermore, server 68 preferably includes or is attached to network disk 83 which provides shared storage accessible by the various computer systems and devices connected to network 18.

Network printer 69 receives files (e.g., print jobs) from computer systems connected to network 18 and output images based on those files. Accordingly, network printer 69 preferably includes network interface 84 which handles communication with network 18.

As mentioned above, gateway 70 provides a connection between network 18 and other networks. Accordingly, gateway 70 preferably includes operating system 85 and E-mail router 86. Operating system 85 provides gateway services to network 18, for example file move/copy services for moving and copying files across the gateway, communication services for ftp operations, and the like. E-mail router 86 provides routing services for E-mail, thereby allowing users to send and to receive E-mail across the gateway.

Computer system 2 also can be connected to other computer systems and device through fax/modem 21. For example, as shown in FIG. 3, fax/modem 21 is connected to fax/modem 88 through telephone line 89, and fax/modem 88 is in turn connected to computer system 90. Computer system 90, which can be a stand-alone computer system or a gateway to other networks, executes operating system 91 and E-mail router 92, for example. Operating system 91 and E-mail router 92 allow computer system 2 to send files to computer systems and other devices connected to computer system 90, such as through E-mail, ftp and file move/copy operations.

It is, of course, possible for computer system 2 to be connected to other computer systems and devices using mechanisms other than those illustrated in FIG. 3. For example, computer system 2 does not need to be connected to network 18, but instead could be connected to other computer systems through a dial-up connection using fax/modem 21 or to another computer system that acts as a gateway to a network.

Image files sent to computer systems 58, 60 and 63 can be processed by those computer systems, and the images stored by the image files can be output through the displays for the computer systems. In addition, the images stored in image files sent to computer 60 can be output through ink jet printer 61, and images stored in image files sent to computer system 63 can be output through laser printer 64. Image files also can be sent to server 68 for storage on network disk 83 attached thereto or through gateways 70 and 90 to other networks such as the World Wide Web.

In the example illustrated in FIG. 3, computer systems 2, 58, 60 and 63 are physically remote from each other, for example located in different rooms or buildings. Likewise, network 18 preferably is physically remote from the other networks. Preferably, computer system 2 with scanner 1 attached thereto is located in an area with common access so as to allow multiple users to access and to use scanner 1.

According to one aspect of the invention, a document is scanned using a scanner such as scanner 1 and a resulting image file is stored on a computer system such as computer system 2. This image file is sent to a remote recipient using a software autosend utility that accesses predefined user profiles such as user profiles 50 for potential recipients. The predefined user profiles include image scanning characteristics and transport protocols for such recipients. Once a particular recipient is identified, the document is scanned according to scanning characteristics for that recipient, and the resulting image file is sent to the recipient using the transport protocol for that recipient. In the preferred embodiment, the autosend utility automatically runs upon initiation of a scan operation.

Figure 4:
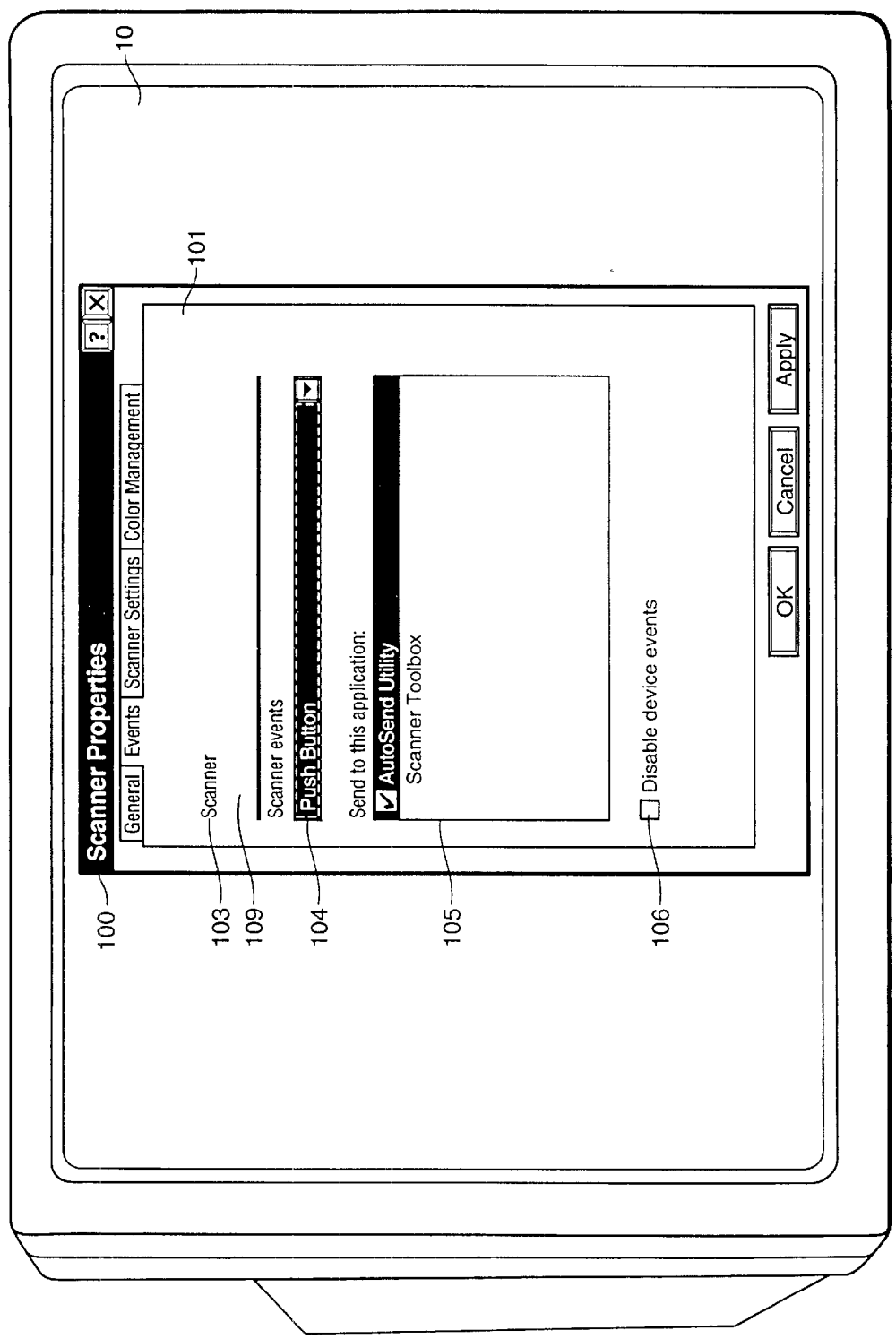
FIG. 4 is a view of a scanner properties window that allows a user to configure a scanner driver so that an autosend utility according to the invention is executed automatically when a scanner push button is depressed.

FIG. 4 is a view of scanner properties window 100 that allows a user to configure scanner driver 44 running on computer system 2 so that autosend utility 46 is executed upon initiation of a scan operation for scanner 1. Scanner properties window 100 is output on display 10 so as to provide a graphical user interface to scanner driver 44.

The Windows® Still Imaging Interface scanner properties window 100 includes events property page 101 which allows a user to specify an application program that is run upon the occurrence of a specific event. As shown in FIG. 4, events property page 101 includes identifier region 103, event selection region 104, application selection region 105, and disable events check box 106.

Identifier region 103 preferably includes label 109 which identifies a device, in this case "scanner", for which an application program is being associated with an event. Event selection region 104 provides access to a PUSH feature of scanner driver 44 which allows a user to specify an event, in this case a push-button event, upon the occurrence of which an application program is executed. Application selection region 105 allows a user to specify the application program that is executed upon the occurrence of the specified event. As shown in FIG. 4, an application entitled "Autosend Utility" is specified. Thus, when computer system 2 detects that a push-button event has occurred for scanner 1, computer system 2 activates autosend utility 46.

Disable events check box 106 can be used to disable the event-based execution of an application program. Thus, if disable events check box 106 is checked, autosend utility 46 is not executed when a push-button event occurs.

FIG. 5 is a representational view of user profiles 50 according to the invention that are accessed by autosend utility 46 upon execution. User profiles 50 include plural user profiles such as user profiles 110, 111 and 112. Each of these user profiles preferably includes name 115, file transport information 116, and image scanning characteristics 117.

Name 115 is a name for a user profile that preferably indicates an intended recipient for an image file sent by autosend utility 46 using the user profile. To accommodate multiple different profiles for the same user, the "name" field can be appended with additional alpha-numeric information that helps identify different profiles for the same user. Thus, an example of name 115 would be "ANDY TOMAT— EMail".

Plural profiles can have names that indicate the same recipient, each with a different transport protocol. In addition, it is possible for a profile to exist that does not correspond to a remote user, but rather to a particular computer system or device such as network printer 69.

File transport information 116 preferably includes transport protocol 119 and transport address 120. Possible transport protocols include, but are not limited to, E-mail, ftp, DCOM, and Windows® file move/copy.

For an E-mail transport protocol, transport address 120 preferably is an E-mail address of the intended recipient corresponding to name 115. This recipient can be a user that has access to any computer system to which computer system 2 can send E-mail, for example through E-mail server 81. The recipient's computer system should run an E-mail client such as the E-mail client in file transport programs 74 to 75 so that the intended recipient can receive and open the E-mail that contains the image file.

If transport protocol 119 is ftp, then transport address 120 preferably is an ftp address for a file that the intended recipient can access. This file can reside on any computer system or device to which computer system 2 can ftp a file. Thus, this ftp address should be for a computer system on a network that has an ftp server such as ftp server 82 running thereon.

If transport protocol 119 is DCOM, then transport address 120 preferably is a name of a DCOM-enabled application program that runs on a remote computer system to which the intended recipient has access. This application program can be any application program that can open the image file and that resides on a computer system with a DCOM client. For example, the application program could reside on any of computer systems 58, 60 or 63 shown in FIG. 3. The remote computer system should have a DCOM client so that the computer system can open the image file in the remote application program.

In the case that transport protocol 119 is Windows® file move/copy, transport address 120 preferably is any file name for saving a file on a remote computer system to which computer system 2 can save files. This file name preferably corresponds to a file on the intended recipient's computer system, such as computer system 58, 60 or 63, a file on a network disk such as network disk 83 or a network disk connected to another computer system on network 18, or any other file that can be accessed by the intended recipient.

The foregoing is not an exhaustive list of possible transport protocols and addresses for user profiles 50. Rather, other transport protocols and transport addresses can be utilized.

Image scanning characteristics 117 preferably include settings for scanning a document with scanner 1. These scanning characteristics include image type 122 which typically is a color mode for scanning the document, such as true color (i.e., 24-bit color), 16-bit color, 8-bit color, and black/white. Also preferably included are image resolution 124, paper size 125 for a scanned image, image file format 126, image file page numbering 127, and temporary image file name 128.

Image resolution 124 is a resolution for scanning a document. This resolution preferably matches the intended recipient's typical use for the image file. For example, if the intended recipient typically views images stored in image files on a display, the resolution should match the resolution of the recipient's display (e.g., 72 dpi). If the intended recipient typically prints the images on a 300 dpi printer, the resolution should be 300 dpi.

Paper size 126 is a paper size for the image stored in the image file. The paper size also should match the intended use for the file. For example, if the file will be printed on letter or A4 paper, paper size 126 should be letter or A4, respectively.

Image file format 127 is a format for the image file and also should match the intended use for the image. Examples of image file formats include, but are not limited to, GIF, TIFF, RAW, JPEG, JBIG and bitmap.

Image file page numbering is a page numbering scheme for images stored in the image file. Examples of page numbering include starting at 0, starting at some arbitrary page number, and starting from a last saved page number from a previous scan operation.

Image file name 128 indicates a temporary image file name for storing an image file created when scanner 1 scans an image.

As indicated by the ellipses in FIG. 5, each user profile can include other transport information, image scanning characteristics, and other types of profile information. In addition, the user profiles need not include all of the different types of information discussed above.

In the preferred embodiment, user profiles 50 are stored on fixed disk 15 of computer system 2, either as text or in an encoded (e.g., binary) form. If user profiles 50 are stored on hard disk 15, computer system 2 can be used to edit the user profiles. Optionally, user profiles 50 can be accessed by users on other computer systems through well-known file sharing techniques, thereby allowing potential recipients of image files to update their profiles from remote computer systems.

In an alternative embodiment, user profiles 50 can be located centrally, for example on network disk 83 attached to server 68, where the profiles preferably can be accessed and edited from some or all of the computer systems on local area network 18. Again, this arrangement allows potential recipients to update their profiles remotely.

Potential recipients preferably update their user profiles so as to accommodate changes in their hardware or software. FIGS. 6 through 9 discussed below illustrate examples of a graphical user interface that can be used to edit user profiles 50.

In more detail, FIGS. 6 through 9 shows add/edit profile window 130 for adding or editing a user profile. Add/edit profile window 130 preferably includes profile name text box 131, transport information region 132, image file region 133, and image acquisition region 134.

In add/edit profile window 130, transport information region 132 includes transport information region 132, transport protocol list box 137, address text box 138, and browse button 139. Image file region 133 includes file name location text box 140, file name text box 141, browse button 142, numbering area 144, and file format list box 146. Image acquisition region 134 includes image type list box 149, image resolution list box 150, paper size list box 151, and numeric paper size boxes 152.

If add/edit profile window 130 is used to edit user profile 110, for example, then name text box 131 is used to edit name 115. Likewise, transport information region 132 is used to edit transport information 116. In transport information region 132, transport protocol list box 137 is used to edit transport protocol 119, and address text box 138 and browse button 139 are used to edit transport address 120.

Continuing with the example of editing user profile 110, image file region 133 and image acquisition region 134 are used to edit image scanning characteristics 117. In particular, file name location text box 140, file name text box 141, and browse button 142 are used to edit temporary image file name 128, numbering area 144 is used to edit image file page numbering 127, and file format list box 146 is used to edit image file format 126. In image acquisition region 134, image type list box 149 is used to edit image type (color mode) 122, image resolution list box 150 is used to edit image resolution 124, and paper size list box 151 and numeric paper size boxes 152 are used to edit paper size 125.

The mechanics of editing a user profile and different examples of user profiles are now described.

Figure 6:
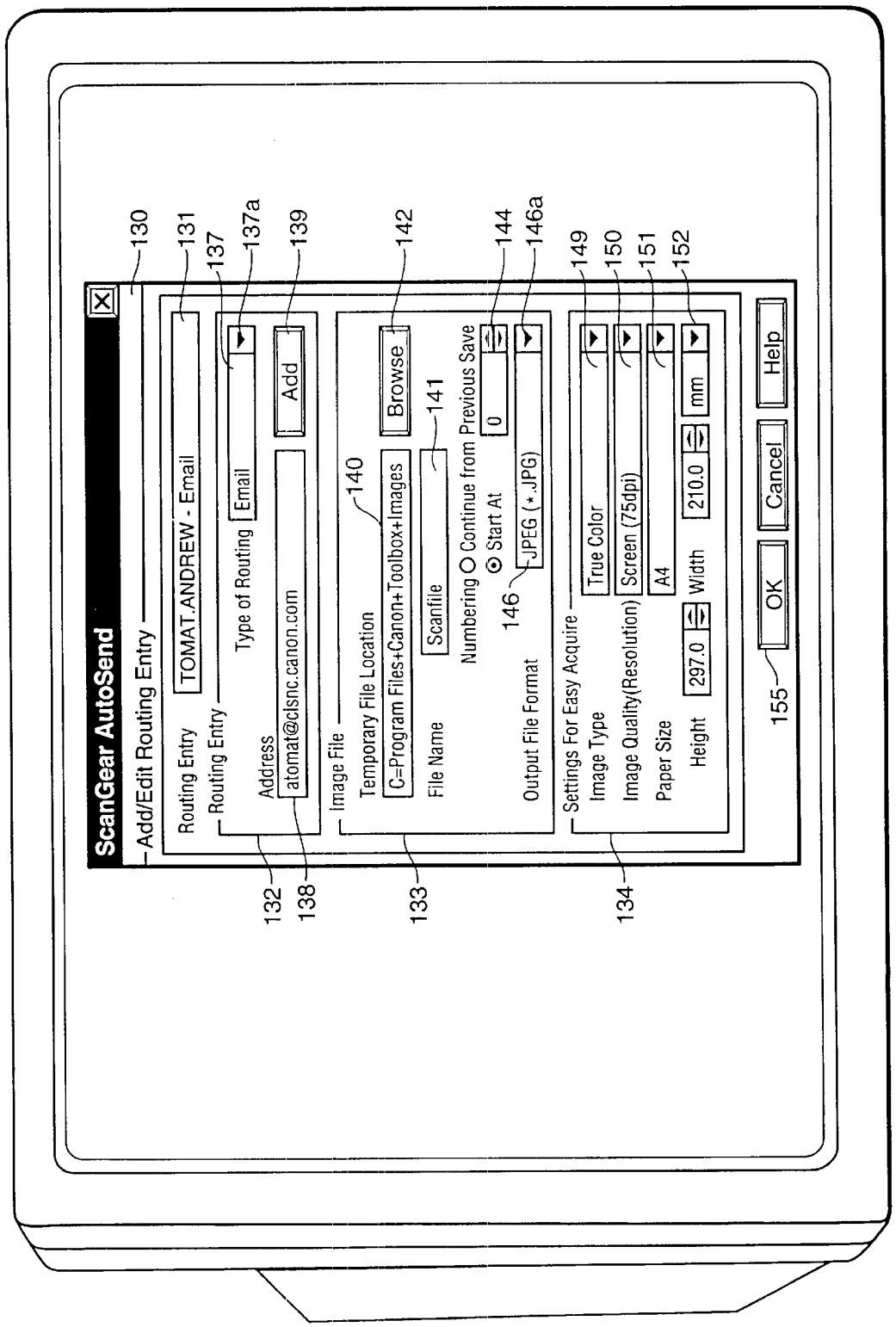
FIGS. 6 through 9 are views of an add/edit profile window for describing the mechanics of editing a user profile and for describing different examples of user profiles, with FIG. 6 showing an add/edit profile window for adding or editing a profile for sending an image file using an E-mail transport protocol, FIG. 7 showing such a window for sending using an ftp transport protocol, FIG. 8 showing such a window for sending by saving the image file to disk, and FIG. 9 showing such a window for sending by opening the file in a remote application using DCOM.

In FIG. 6, the name "TOMAT, ANDREW—Email" has been entered in profile name text box 141. The name indicates that the intended recipient for a file sent using this profile is Andrew Tomat and that the file will be sent using an E-mail transport protocol. Accordingly, in transport information region 132, "Email" has been entered in transport protocol list box 137, and an E-mail address for Andrew Tomat has been entered in address text box 138.

In order to change the transport protocol for this entry, a user clicks on protocol list button 137a in protocol list box 137, causing a list of transport protocols to be displayed. The user then selects one of these transport protocols and changes address text box 138 accordingly. Different types of transport protocols and examples of addresses for those protocols are described below with reference to FIGS. 7 through 9. In the preferred embodiment, a new transport protocol can be added to the list by using add button 139.

In image file region 133, a user enters a file location in file location text box 140 and a file name in file name list box 141 so as to specify a location for storing the temporary image file created when scanner 1 scans a document. The file location and file name can be entered either from keyboard 12 or through use of browse button 142 which allows a user to search hard disk 15 for an appropriate location. Preferably, the file location is specified so that the temporary image file is stored as one of image files 49 on hard disk 15.

Numbering area 144 allows a user to specify a method for numbering pages of scanned documents, namely sequentially from a previous scan operation or starting at a fixed number.

File format list box 146 in image file region 133 allows a user to specify a file format for the image file that will be sent to the address specified in address text box 138. As shown in FIG. 6, a JPEG file format has been selected. Other file formats preferably can be listed by clicking on format list button 146a so as to cause a list of file formats to appear, preferably including at least GIF, TIFF, RAW, JPEG, JBIG and bitmap. The user then selects one of the file formats from this list.

Image acquisition region 134 allows a user to specify image scanning characteristics appropriate to the intended recipient of the image file resulting from the scan operation. Image type list box 149 allows a user to specify an image type for the image of the scanned document. The image type typically is a color mode for scanning the document, such as true color (i.e., 24-bit color), 16-bit color, 8-bit color, and black/white. Image resolution list box 150 allows a user to specify an image resolution for scanning the document, and paper size list box 151 allows a user to specify a paper size for the image. Each of the list boxes includes a drop button for use in selecting a different image type, image resolution, and paper size. Paper size also can be specific using numeric paper size boxes 152.

If the intended recipient of the image file typically uses computer system 60 with ink jet printer 61 attached thereto, and if the ink jet printer is a high resolution color ink jet printer, appropriate information for image acquisition region 134 might be true color at 720 dpi by 1440 dpi resolution on letter paper. Likewise, if the intended recipient typically uses computer system 63 with laser printer 64 attached thereto, and if the laser printer is a low-resolution black and white laser printer, appropriate information for image acquisition region 134 might be black/white at 300 dpi resolution on A4 paper. As another example, the information shown in FIG. 6 is appropriate for a profile for an intended recipient that will view the image on a display capable of showing true color (i.e., 24-bit color) images at 75 dpi resolution.

Once a user is satisfied with the information in add/edit profile window 130, the user activates OK button 155, preferably by either clicking on the button or by pressing the return key on keyboard 12. Then, if the name in profile name text box 131 corresponds to an existing profile in user profiles 50, that existing profile is edited according to the information in add/edit profile window 130. If the name does not correspond to an existing profile, a profile is created in user profiles 50.

Figure 7:
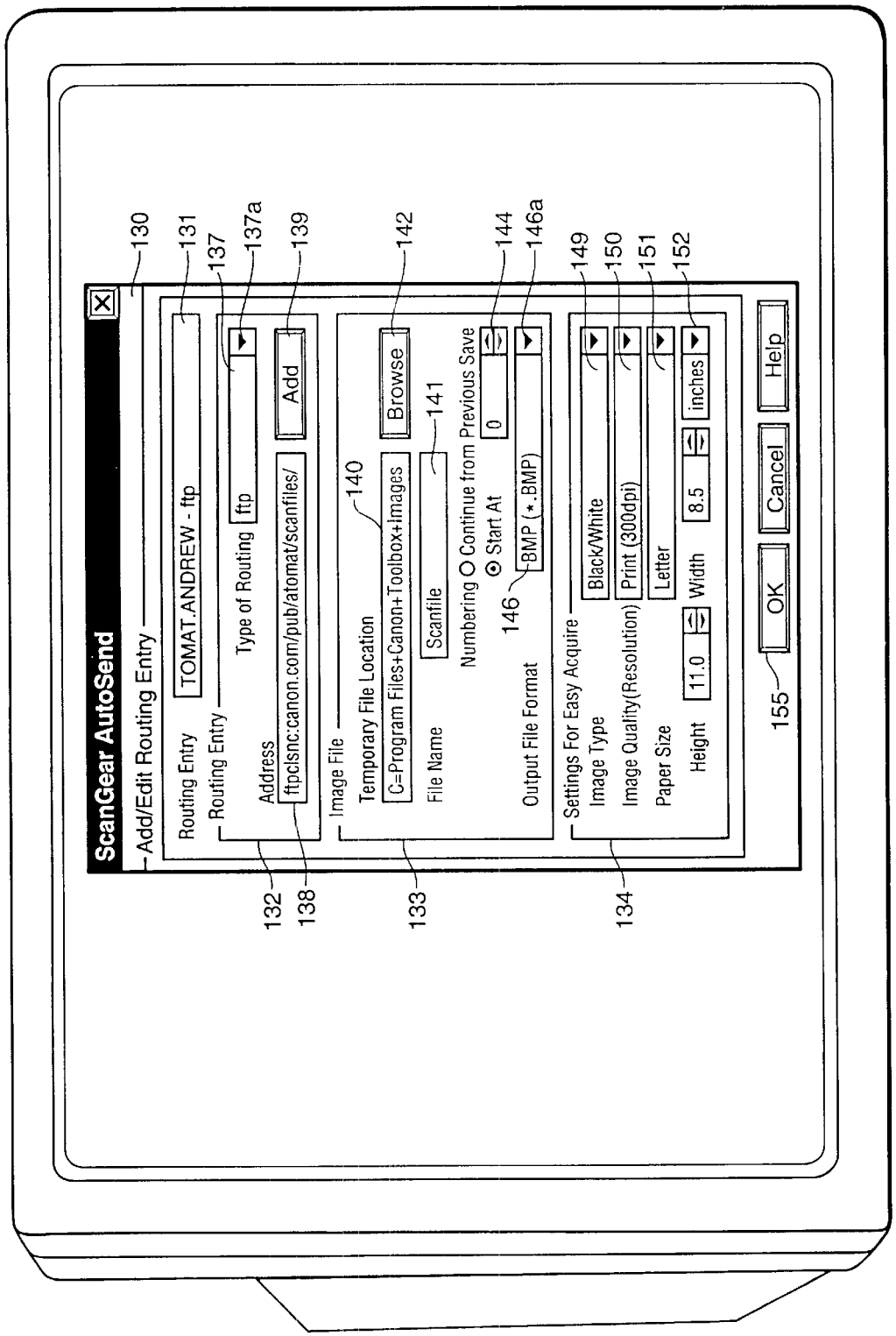

FIG. 7 shows add/edit profile window 130 for adding or editing a profile for sending an image file using an ftp transport protocol. In FIG. 7, the name "TOMAT, ANDREW—ftp" has been entered in profile name text box 131. The name indicates that the intended recipient for a file sent using this profile is Andrew Tomat and that the file will be sent using an ftp transport protocol. Accordingly, "ftp" has been entered in transport protocol list box 137, and an ftp address for Andrew Tomat has been entered in address text box 138.

Image file region 133 in FIG. 7 is identical to the same region illustrated in FIG. 6, with the exception that file format list box 146 has been changed to indicate a bitmap file format. In image acquisition region 134, image type list box 149 has been changed to black/white, image resolution list box 150 has been changed for printing at 300 dpi, and paper size list box 151 has been changed to letter sized paper. These changes have been made by way of example to illustrate a possible profile for sending an image to a recipient that will print the image using a black and white printer. It is, of course, possible for image file region 133 and image acquisition region 134 to be changed in other ways as appropriate for the recipient.

Figure 8:
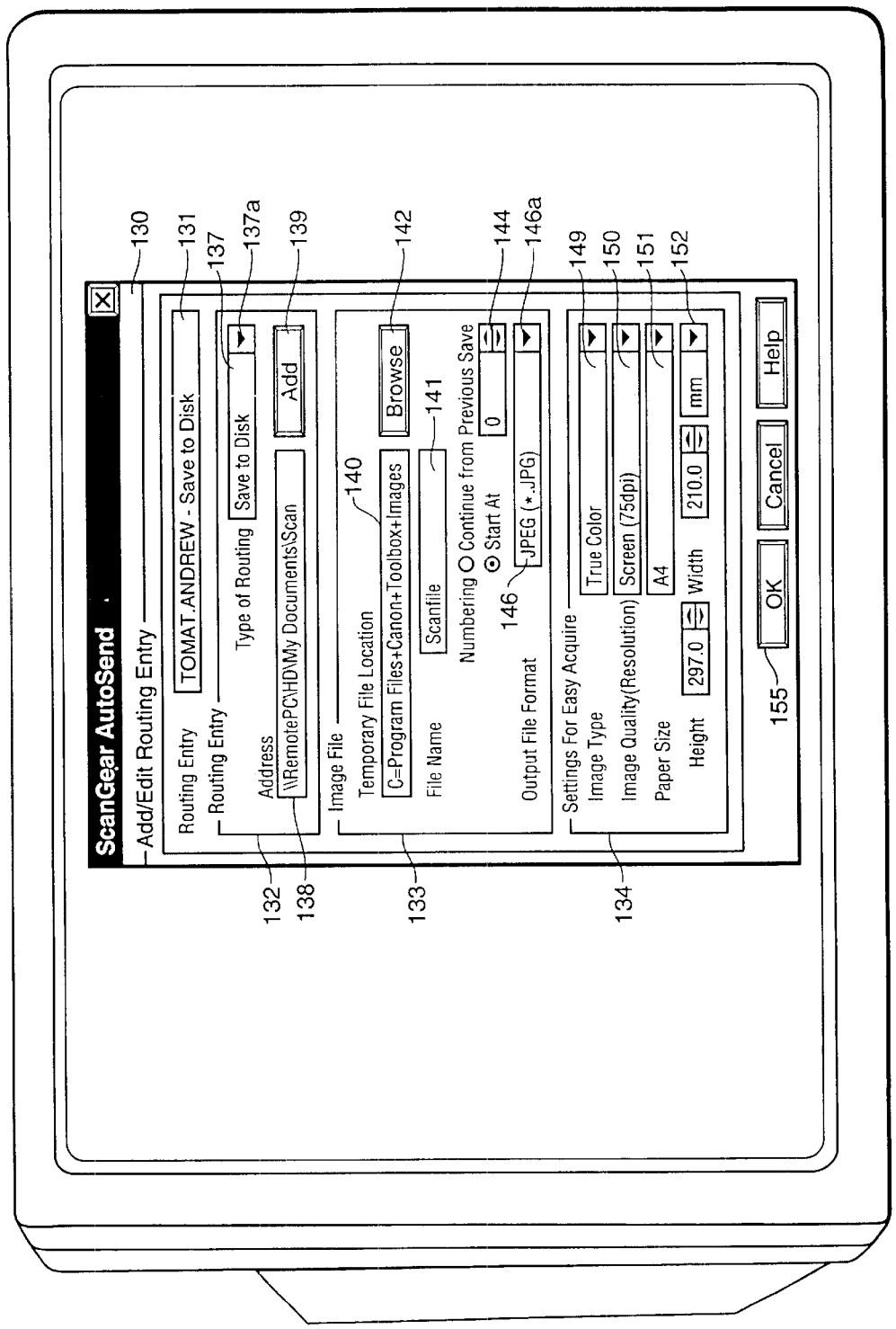

FIG. 8 shows add/edit profile window 130 for adding or editing a profile for sending an image file by saving the image file to disk. The name indicates that the intended recipient for a file sent using this profile is Andrew Tomat and that the file will be sent by saving the file to disk. Accordingly, "Save to Disk" has been entered in transport protocol list box 137, and a file name for saving the file has been entered in address text box 138. Preferably, the file name is for a fixed disk attached to a computer system other than computer system 2 or attached to a server, for example network disk 83 attached to server 68.

Image file region 133 and image acquisition region 134 in FIG. 8 are identical to those same regions illustrated in FIG. 6. It is, of course, possible for image file region 133 and image acquisition region 134 to be changed as appropriate for the recipient corresponding to the profile.

Figure 9:
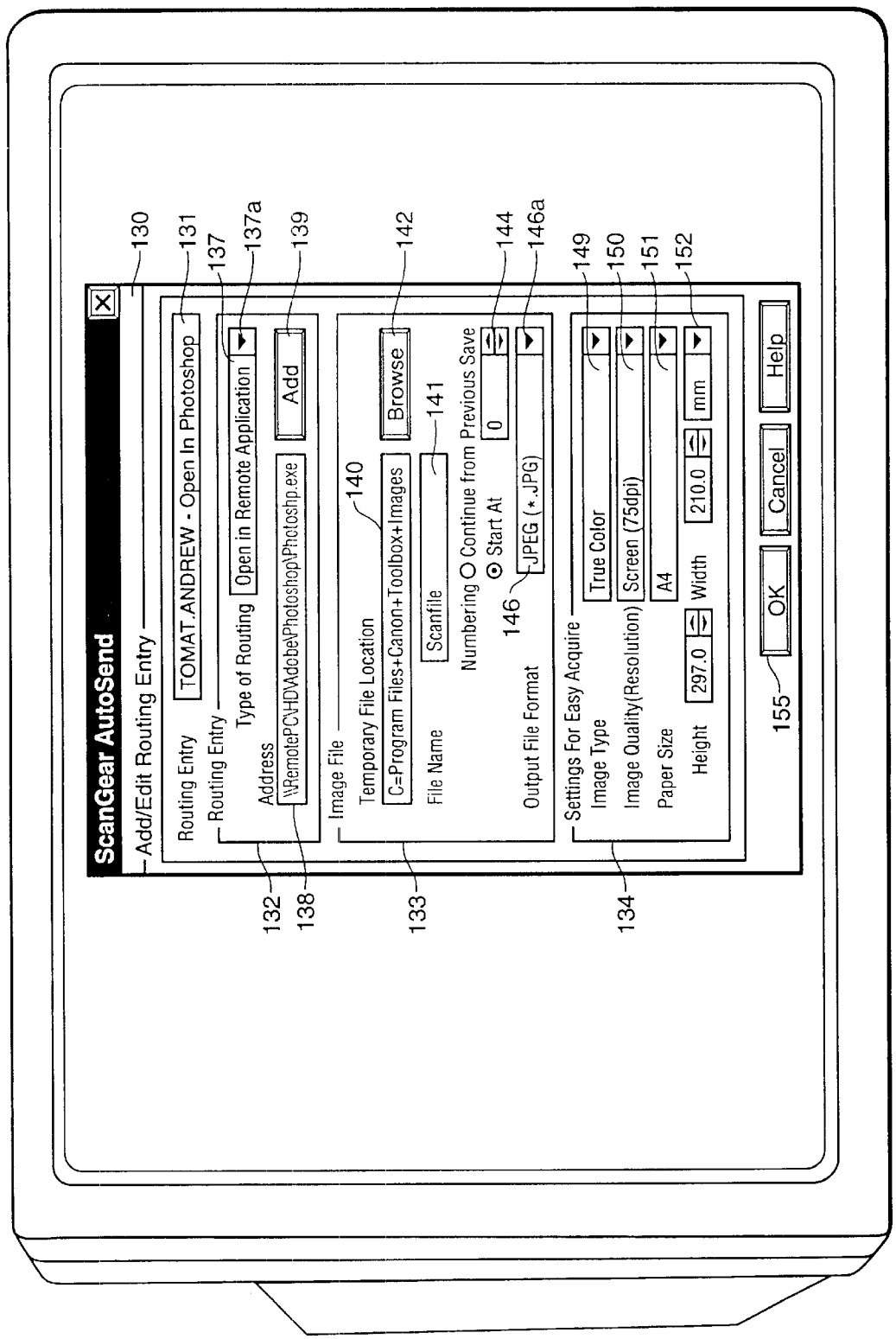

FIG. 9 shows add/edit profile window 130 for adding or editing a profile for sending an image file by opening the file in a DCOM-enabled remote application, for example a graphics processing application such as Photoshop® running on a remote computer system. The name indicates that the intended recipient for a file sent using this profile is Andrew Tomat and that the file will be sent by opening the file in a remote application. Accordingly, "Open in Remote Application" has been entered in transport protocol list box 137, and a file name for the remote application has been entered in address text box 138. The transport protocol in this example is actually the DCOM transport protocol used to send an image file to a DCOM-enabled remote application and open the image file in that application.

Image file region 133 and image acquisition region 134 in FIG. 9 are identical to those same regions illustrated in FIG. 6. It is, of course, possible for image file region 133 and image acquisition region 134 to be changed as appropriate for the recipient corresponding to the profile.

Figure 10:
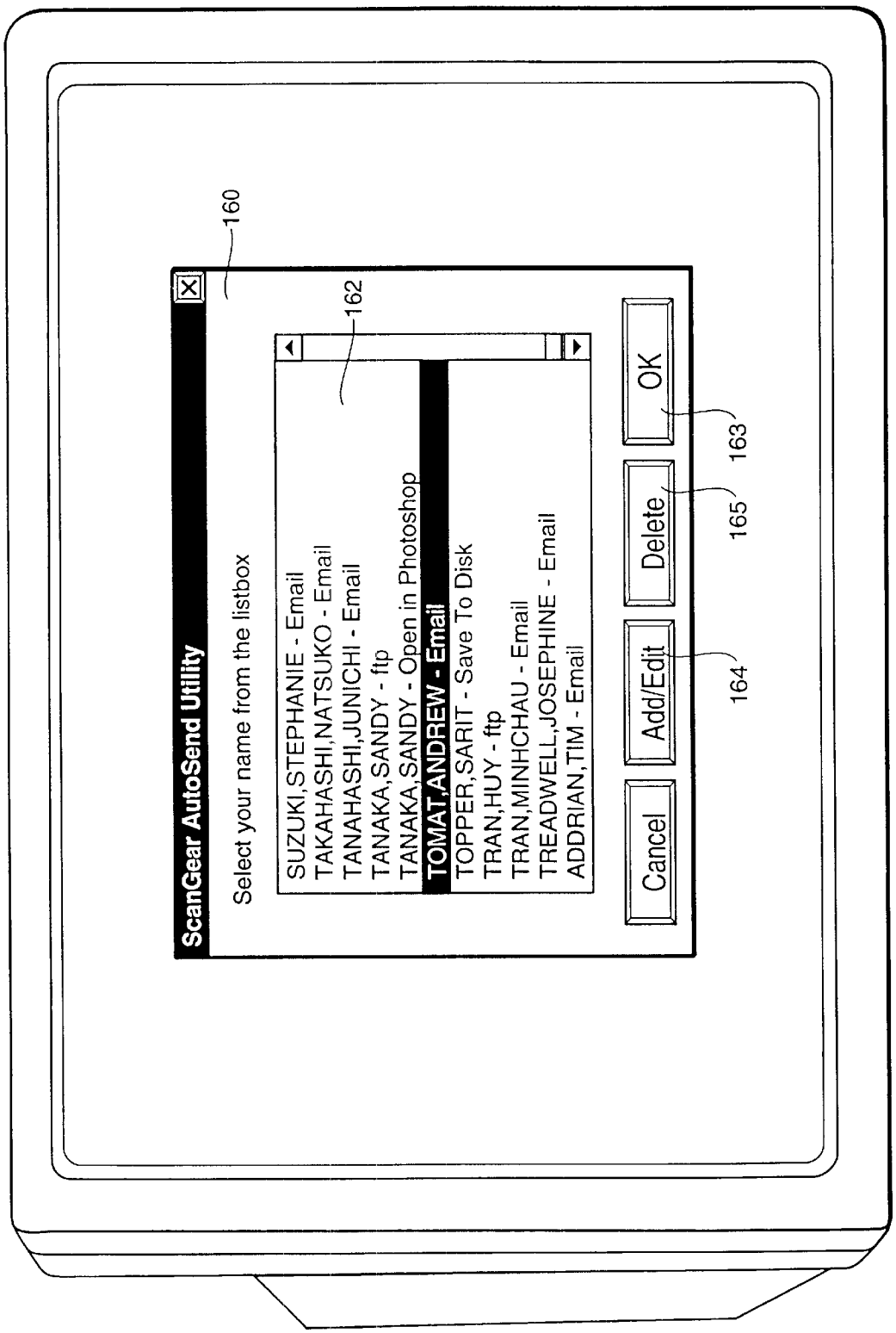
FIG. 10 is a view of an autosend utility window that is displayed by an autosend utility according to the invention.

FIG. 10 is a view of autosend utility window 160 that is output on display 10 by autosend utility 46 upon initiation of execution. Autosend utility window 160 preferably includes at least profile selection region 162 which in turn includes a list of names based on user profiles 50. These names preferably indicate intended recipients and associated transport protocols for those recipients. The different transport protocols preferably include at least E-mail, ftp, "save to disk" (Windows® file move/copy), and "open in application" (DCOM).

As shown in FIG. 10, plural names can contain the same intended recipient, each with a different transport protocol. In addition, it is possible for a name to exist that does not correspond to a user, but rather to a particular computer system or device such as network printer 69.

Autosend utility window 160 includes OK button 163 for use in selection of a profile from profile selection region 162. Also included in autosend utility window 160 are add/edit button 164, which can be used to call up add/edit profile window 130 described above, and delete button 165 which can be used to delete a profile.

Figure 11:
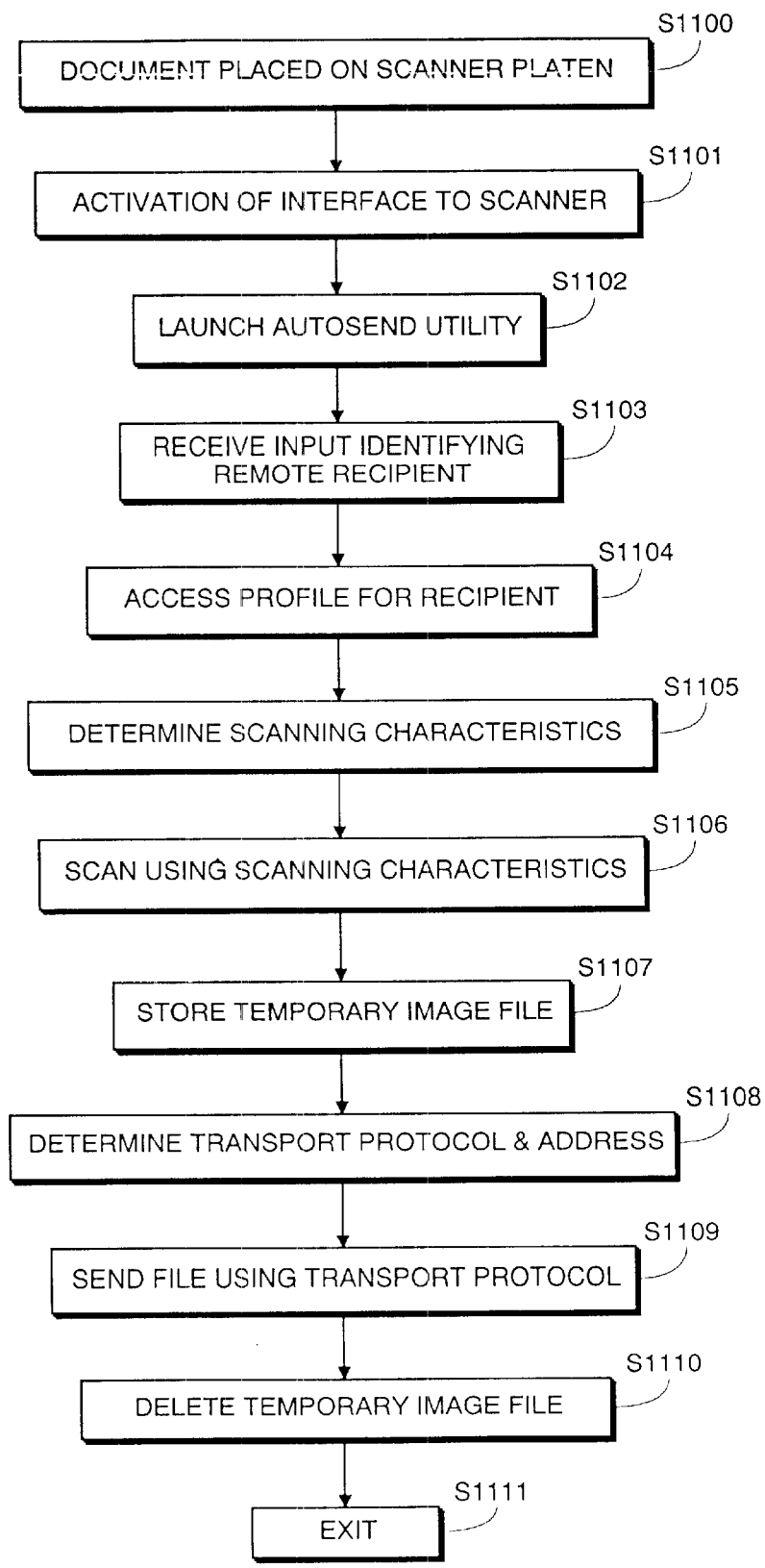
FIG. 11 is a flow chart for explaining the operation of an autosend utility according to the invention in automatically sending an image file for a scanned document to an intended recipient according to a predefined profile.

FIG. 11 is a flow chart for explaining the operation of the autosend utility according to the invention in automatically sending an image file for a scanned document to an intended recipient according to a predefined profile. FIG. 11 illustrates process steps stored as computer-executable code on a computer-readable medium such as fixed disk 15. Briefly, according to FIG. 11, a document is scanned and a corresponding image file is sent to a remote recipient using an autosend utility, with the autosend utility accessing predefined profiles of potential recipients so as to determine parameters for the scanning and sending operations. The autosend utility is launched and receives user input, the user input identifying the remote recipient. Based on the profile corresponding to the identity of the remote recipient, the autosend utility determines image scanning characteristics and a transport protocol for image data. The document is scanned in accordance with the determined image scanning characteristics. A temporary image file containing image data for the scanned document is stored and then is sent to the remote recipient using the determined transport protocol.

In more detail, in order for a user to create an image file from a physical document and to send that image file to a remote recipient, the user in step S1100 places the document on platen 4 of scanner 1 and covers the document with cover 5. Then, in step S1101, the user signals computer 2 to initiate a scan operation by manipulating interface 6 of scanner 1, preferably by pressing a button (or STI) on interface 6 (i.e., "one button scanning"), thereby signalling computer 2.

In step S1102, scanner driver 44 determines that the activation of scanner 1 is a push-button event for scanner 1. In accordance with information previously entered in scanner properties window 101 (FIG. 4), scanner driver 44 launches autosend utility 46.

Upon being launched, autosend utility 46 accesses user profiles 50, which include predefined profiles for potential recipients that preferably have been added or edited as discussed above with reference to FIGS. 6 through 9. Autosend utility 46 then displays autosend utility window 160 shown in FIG. 10 with a list of names of possible recipients based on user profiles 50. This list is displayed in name selection region 162 of autosend utility window 160.

In step S1103, the user selects an intended recipient from the list in name selection region 162. For example, the user highlights a profile from the list using keyboard 12 or a pointing device such as mouse 13, and then the user selects OK button 163. Alternatively, the user double-clicks on a name in the list using mouse 13.

Autosend utility 46 accesses the profile from user profiles 50 corresponding to the intended recipient in step S1104.

Based on this profile, autosend utility 46 in step S1105 determines image scanning characteristics for scanning the document.

Scanner driver 44 is instructed by autosend utility 46 to scan the document using the determined image scanning characteristics, in step S1106. For example, if the selected user profile is user profile 110, these characteristics are image scanning characteristics 117. The image scanning characteristics preferably include at least an image type such as a color mode, image resolution and paper size.

Advantageously, the scanning characteristics are automatically set in accordance with the user profile, relieving the user of the need to set the characteristics manually. In the preferred embodiment, however, the user can change or set the image scanning characteristics before the actual scanning of the document occurs, if desired. The user can change the image scanning characteristics by selecting a name in profile selection section 162 and then clicking on add/edit button 164. In response, autosend utility 46 displays add/edit profile window 130, which can be used to change the image scanning characteristics (and transport information) for the selected recipient, as described above with respect to FIGS. 6 to 9. Then, once the user saves the changes by clicking on OK button 155 in add/edit profile window 130, the user can click on OK button 163 in autosend utility window 160 to scan the document.

In step S1107, an image file that results from scanning the document is stored as a temporary image file. This temporary image file preferably is stored at the location specified by the selected user profile. For example, with reference to user profile 110, the location is specified by temporary image file name 128. The image file preferably is stored in a format specified by the selected user profile, such as image file format 126.

In step S1108, autosend utility 46 determines transport information for sending the image file. The transport information is determined based on the user profile for the intended recipient and preferably includes at least a transport protocol and a transport address. For example, if the user profile for the intended recipient is user profile 110, the transport information is transport information 116, preferably including transport protocol 119 and transport address 120.

It should be noted that step S1108 can occur before the document is scanned, for example, simultaneously with step S1105. In that case, the transport information can be changed from the values in the user profile at the same time as the scanning characteristics are changed, as described above with respect to step S1106. Depending on the transport protocol, the file is actually sent by various application programs or operating system functions under direction of autosend utility 46.

If the image file is sent using E-mail or ftp, the file transport is performed by the E-mail or ftp client residing on computer system 2 and the E-mail or ftp server(s) for each network across which the image file is sent. For example, if the intended recipient resides on network 18, then the server is E-mail server 81 or ftp server 82 for network 18.

If the image file is sent using DCOM, then the file transport is performed by the DCOM client on computer system 2 and the DCOM client on the computer system of the intended recipient. In this case, the DCOM clients open the image file in the application program that was specified as the address for sending the image file.

If the image file is sent using Windows® file move/copy, operating system 42, which in this case is Windows®, transports the file.

In any case, the image file can be sent across a network such as network 18, through a dial-up connection to another computer system, network, or device through fax/modem 21, or through any other communication mechanism using the protocol and address specified by the selected user profile. Advantageously, once the user profiles are created, the user can send the image file without having to even know what file transport protocol or what address is used to send the file.

After the image file is sent, the temporary image file preferably is deleted in step S1110 so as to save space on hard disk 15. Autosend utility 46 then exits in step S1111.

At the remote side, the image file is received by and can be processed as desired by the recipient. For example, if the image is sent to a user who uses computer system 58 on a network 18 via E-mail, that user can view the E-mail using an E-mail client, save the image file from the E-mail client, and otherwise process the image file. Users who receive an image file on computer systems 60 and 63, for example, via E-mail, ftp, or Windows® file copy/move, likewise can manipulate the image file and can print the image file using ink jet printer 61 or laser printer 64, respectively. If an image file is opened in an application program on one of the computer systems through use of the DCOM protocol, the application program can be used to manipulate, print or save the image file, depending on the application program. As another example, if an image file is sent to network printer 69, network interface 84 preferably causes network printer 69 to print the image stored in the image file. In sum, an image file and associated image can be processed, manipulated, stored and output in any way that the recipient user or device can process, manipulate, store or output image files and the images stored therein.

While the invention has been described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for scanning a document and sending a corresponding image file to a recipient using an autosend utility that accesses predefined profiles of potential recipients, the predefined profiles including image scanning characteristics for such recipients, the method comprising the steps of:

launching the autosend utility;

receiving user input to the autosend utility, the user input identifying the recipient;

determining, based on the profile corresponding to the identity of the recipient, image scanning characteristics;

scanning the document in accordance with the determined image scanning characteristics;

storing a temporary image file containing image data for the scanned document; and sending the temporary image file to the recipient using a predetermined transport protocol that corresponds with the recipient identified by the user input, wherein, upon launching the autosend utility, the profile is predefined such that essential user input is limited to identifying the recipient.

2. The method according to claim 1, wherein a scanning device used to scan the document is attached to a computing device that implements the method, and wherein the autosend utility is launched in response to activation of an interface to the scanning device.

3. The method according to claim 2, wherein the interface to the scanning device is a push button on the scanning device.

4. The method according to claim 2, wherein the interface to the scanning device is an STI interface on the scanning device.

5. The method according to claim 1, further comprising the step of deleting the temporary image file.

6. The method according to claim 1, wherein the predetermined transport protocol comprises E-mail, ftp, DCOM or Windows file move/copy.

7. The method according to claim 1, wherein the predefined profiles are stored locally on a computing device that implements the method.

8. The method according to claim 1, wherein the predefined profiles are stored centrally and are updatable by each of the potential recipients.

9. The method according to claim 1, wherein the scanning characteristics include at least scanning resolution and color mode.

10. A method according to claim 1, wherein the predetermined transport protocol is defined by the recipient's profile.

11. An apparatus for scanning a document and sending a corresponding image file to a recipient using an autosend utility that accesses predefined profiles of potential recipients, the predefined profiles including image scanning characteristics for such recipients, the apparatus comprising:
an interface to a scanning device;
a memory including a region for storing executable process steps; and
a processor for executing the executable process steps, wherein the executable process steps include steps of: (a) launching the autosend utility, (b) receiving user input to the autosend utility, the user input identifying the recipient, (c) determining, based on the profile corresponding to the identity of the recipient, image scanning characteristics, (d) sending an instruction through the interface to the scanning device to scan the document in accordance with the determined image scanning characteristics, (e) receiving image data from the scanning device for the scanned document, (f) storing a temporary image file containing the image data, and (g) sending the temporary image file to the recipient using a predetermined transport protocol that corresponds with the recipient identified by the user input,
wherein, upon launching the autosend utility, the profile is predefined such that essential user input is limited to identifying the recipient.

12. The apparatus according to claim 11, further comprising a scanning device connected to the interface, wherein the autosend utility is launched in response to activation of a user interface to the scanning device.

13. The apparatus according to claim 12, wherein the user interface to the scanning device is a push button on the scanning device.

14. The apparatus according to claim 12, wherein the user interface to the scanning device is an STI interface on the scanning device.

15. The apparatus according to claim 11, wherein the executable process steps further include the step of deleting the temporary image file.

16. The apparatus according to claim 11 wherein the predetermined transport protocol comprises E-mail, ftp, DCOM or Windows file move/copy.

17. The apparatus according to claim 11, wherein the predefined profiles are stored locally in the apparatus.

18. The apparatus according to claim 11, wherein the predefined profiles are stored centrally and are updatable by each of the potential recipients.

19. The apparatus according to claim 11, wherein the scanning characteristics include at least scanning resolution and color mode.

20. An apparatus according to claim 11, wherein the predetermined transport protocol is defined by the recipient's profile.

21. A utility program, the utility program for instructing a scanning device to scan a document and for sending a corresponding image file to a recipient by accessing predefined profiles of potential recipients, the predefined profiles including image scanning characteristics for such recipients, the program comprising:
code to receive user input, the user input identifying the recipient;
code to determine, based on the profile corresponding to the identity of the recipient, image scanning characteristics;
code to instruct the scanning device to scan the document in accordance with the determined image scanning characteristics;
code to store a temporary image file containing image data for the scanned document; and
code to send the temporary image file to the recipient using a predetermined transport protocol that corresponds with the recipient identified by the user input,
wherein, upon launching the autosend utility, the profile is predefined such that essential user input is limited to identifying the recipient.

22. The utility program according to claim 21, wherein a scanning device used to scan the document is attached to a computing device which executes the utility program, and wherein the autosend utility is launched in response to activation of an interface to the scanning device.

23. The utility program according to claim 22, wherein the interface to the scanning device is a push button on the scanning device.

24. The utility program according to claim 22, wherein the interface to the scanning device is an STI interface on the scanning device.

25. The utility program according to claim 21, further comprising code to delete the temporary image file.

26. The utility program according to claim 21, wherein the predetermined transport protocol comprises E-mail, ftp, DCOM or Windows file move/copy.

27. The utility program according to claim 21, wherein the predefined profiles are stored locally on a computing device which executes the utility program.

28. The utility program according to claim 21, wherein the predefined profiles are stored centrally and are updatable by each of the potential recipients.

29. The utility program according to claim 21, wherein the scanning characteristics include at least scanning resolution and color mode.

30. A utility program according to claim 21, wherein the predetermined transport protocol is defined by the recipient's profile.

31. A computer-readable medium which stores a utility program, the utility program comprising computer-executable process steps to instruct a scanning device to scan a document and to sending a corresponding image file to a recipient by accessing predefined profiles of potential recipients, the predefined profiles including image scanning characteristics for such recipients, the computer-executable process steps comprising:

- a receiving step to receive user input, the user input identifying the recipient;
- a determining step to determine, based on the profile corresponding to the identity of the recipient, image scanning characteristics;
- a scanning step to instruct the scanning device to scan the document in accordance with the determined image scanning characteristics;
- a storing step to store a temporary image file containing image data for the scanned document; and
- a sending step to send the temporary image file to the recipient using the predetermined transport protocol that corresponds with the recipient identified by the user input,
- wherein, upon launching the autosend utility, the profile is predefined such that essential user input is limited to identifying the recipient.

32. A computer-readable medium according to claim 31, wherein the predetermined transport protocol is defined by the recipient's profile.

* * * * *

UNITED STATES PATENT AND TRADEMARK OFFICE
CERTIFICATE OF CORRECTION

PATENT NO. : 6,459,499 B1 Page 1 of 1
DATED : October 1, 2002
INVENTOR(S) : Andrew Hunter Tomat It is certified that error appears in the above-identified patent and that said Letters Patent is hereby corrected as shown below:

Title page,
Item [56], References Cited, FOREIGN PATENT DOCUMENTS, "410276288 A" should read, -- 10-276288 A -- OTHER PUBLICATIONS, "Xeros" should read -- Xerox --;
Item [57], ABSTRACT,
Line 4, "including" should read -- include --.

Column 5,
Line 54, "file" should read -- files --.

Column 6,
Line 22, "device" should read -- devices --.

Column 13,
Line 6, "characteristics,in" should read -- characteristics in --.

Signed and Sealed this

Eighteenth Day of May, 2004

JON W. DUDAS
*Acting Director of the United States Patent and Trademark Office*